US012753788B2

(12) United States Patent
Svensson et al.

(10) Patent No.: US 12,753,788 B2
(45) Date of Patent: Oct. 6, 2026

(54) MECHANICAL CONNECTION ARRANGEMENT FOR PANELS

(71) Applicant: Välinge Innovation AB, Viken (SE)

(72) Inventors: Johan Svensson, Kattarp (SE); Peter Derelöv, Helsingborg (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

(21) Appl. No.: 18/729,224

(22) PCT Filed: Aug. 26, 2022

(86) PCT No.: PCT/EP2022/073753
§ 371 (c)(1),
(2) Date: Jul. 16, 2024

(87) PCT Pub. No.: WO2023/143756
PCT Pub. Date: Aug. 3, 2023

(65) Prior Publication Data

US 2025/0064206 A1 Feb. 27, 2025

(30) Foreign Application Priority Data

Jan. 31, 2022 (SE) .................................... 2250091-2
Feb. 17, 2022 (WO) ................. PCT/EP2022/053886

(51) Int. Cl.
*F16B 12/24* (2006.01)

(52) U.S. Cl.
CPC .................................... *F16B 12/24* (2013.01)

(58) Field of Classification Search
CPC . A47B 2230/0029-0051; A47B 47/042; F16B 12/24
See application file for complete search history.

(56) References Cited

U.S. PATENT DOCUMENTS

2019/0323534 A1 10/2019 Derelöv
2020/0069048 A1* 3/2020 Derelöv .................. F16B 12/20
2020/0340513 A1 10/2020 Derelöv

FOREIGN PATENT DOCUMENTS

CN 112292537 A 1/2021
DE 1107910 B 5/1961
(Continued)

OTHER PUBLICATIONS

Office Action issued by the China National Intellectual Property Administration (CNIPA) on Aug. 15, 2025, in Chinese Application No. 2022800149057, 18 pages.
(Continued)

*Primary Examiner* — Matthew W Ing
(74) *Attorney, Agent, or Firm* — Boone IP Law

(57) ABSTRACT

A mechanical connection arrangement for panels, including a first panel, a second panel and a mechanical locking device for locking the first panel to the second panel. The mechanical locking device includes at least one rod-shaped element at the surface of the first panel and at least one corresponding insertion recess at the surface of the second panel. The rod-shaped element is configured to be inserted in the insertion recess. The lateral surface of the rod-shaped element extends at a first angle from the surface of the first panel and the lateral side of the insertion recess extends into the second panel at a second angle from the surface of the second panel. The rod-shaped element is configured to bend when inserted in the insertion recess, such that the first angle in the locked position is different from the first angle in an unlocked position of the panels.

22 Claims, 9 Drawing Sheets

(56) References Cited

FOREIGN PATENT DOCUMENTS

| | | | |
|---|---|---|---|
| EP | 2487309 | A1 | 8/2012 |
| EP | 3871559 | A1 | 9/2021 |
| EP | 4052613 | A1 | 9/2022 |
| WO | 2020046193 | A1 | 3/2020 |
| WO | 2020046194 | A1 | 3/2020 |
| WO | 2021150162 | A1 | 7/2021 |
| WO | 2021170749 | A1 | 9/2021 |

OTHER PUBLICATIONS

U.S. Appl. No. 16/553,350, filed Aug. 28, 2019, Peter Derelöv.
U.S. Appl. No. 16/856,765, filed Apr. 23, 2020, Peter Derelöv.
U.S. Appl. No. 17/173,823, filed Feb. 11, 2021, Peter Derelöv.
U.S. Appl. No. 17/588,733, filed Jan. 31, 2022, Peter Derelöv.
U.S. Appl. No. 17/709,994, filed Mar. 31, 2022, Johan Svensson.
U.S. Appl. No. 17/710,055, filed Mar. 31, 2022, Johan Svensson.
U.S. Appl. No. 17/883,203, filed Aug. 8, 2022, Christian Boo.
U.S. Appl. No. 17/886,517, filed Aug. 12, 2022, Peter Derelöv.
U.S. Appl. No. 18/191,444, filed Mar. 28, 2023, Johan Svensson.
U.S. Appl. No. 18/312,808, filed May 5, 2023, Johan Svensson.
U.S. Appl. No. 18/383,242, filed Oct. 24, 2023, Peter Derelöv.
U.S. Appl. No. 18/764,217, filed Jul. 4, 2024, Thomas Meijer.
International Search Report mailed on Dec. 22, 2022, by the European Patent Office for International Application No. PCT/EP2022/073753, 5 Pages.
Written Opinion mailed on Dec. 22, 2022, by the European Patent Office for International Application No. PCT/EP2022/073753, 7 Pages.
U.S. Appl. No. 18/983,417, filed Dec. 17, 2024, Thomas Meijer.
U.S. Appl. No. 19/093,758, filed Mar. 28, 2025, Peter Derelöv.
Office Action issued by the European Patent Office on Jul. 24, 2025, in European Application No. 22769617.6, 4 pages.
U.S. Appl. No. 19/543,956, filed Feb. 19, 2026, Marko Sostar.
U.S. Appl. No. 19/296,395, filed Aug. 11, 2025, Peter Derelöv.
U.S. Appl. No. 19/391,685, filed Nov. 17, 2025, Peter Derelöv.
U.S. Appl. No. 19/262,950, filed Jul. 8, 2025, Johan Svensson.
U.S. Appl. No. 19/655,806, filed Apr. 23, 2026, Marko Sostar.
European Intent to Grant issued by the European Patent Office on Apr. 2, 2026 in Swedish Application No. 22769617.6, 41 pages.
U.S. Appl. No. 19/695,149, filed Jun. 2, 2026, Johan Svensson.
U.S. Appl. No. 19/698,092, filed Jun. 4, 2026, Marko Sostar.
U.S. Appl. No. 19/581,371, filed Apr. 23, 2026, Hans Brännström.

* cited by examiner

MECHANICAL CONNECTION ARRANGEMENT FOR PANELS

TECHNICAL FIELD OF THE INVENTION

The present invention concerns a mechanical connection arrangement for panels and a method for connecting panels using the mechanical connection arrangement. The arrangement comprises a first panel, a second panel and a mechanical locking device for locking the first panel to the second panel. A surface of the first panel and a surface of the second panel are parallel and in contact in a locked position of the first and second panels. The mechanical locking device comprises at least one rod-shaped element at said surface of the first panel and at least one corresponding insertion recess at said surface of the second panel. The rod-shaped element is configured to be inserted in the insertion recess. The rod-shaped element extends at a first angle from the surface of the first panel. The insertion recess extends into the second panel at a second angle from the surface of the second panel.

BACKGROUND

Assembling two or more objects into one piece, for instance furniture, has historically required tools such as drills, screwdrivers, hammers, and wrenches.

Starting with click floors, assembling not requiring tools has further been developed and more or less all types of furniture in a household could be assembled without tools or at least with a minimum of tools.

WO 2020/046193 discloses a set including a first panel, a second panel and a mechanical locking device for locking the first panel to the second panel. The first panel includes a first edge surface and the second panel includes a second panel surfaced. The mechanical locking device includes at least one rod-shaped element that extends at a first angle from the first edge surface. An insertion groove extends into the second panel surface at a second angle from the second panel surface. The mechanical locking device further includes at least one locking groove and at least one locking part. The locking groove includes at least one locking surface extending at a third angled from the first edge surface or from the second panel surface. The locking part is configured to be inserted into the locking groove and lock against the locking surface. The third angle is different than the first angle.

WO 2020/046194 discloses a set including a first panel, a second panel and a mechanical locking device for locking the first panel to the second panel. The first panel includes a first edge surface and the second panel includes a second panel surface. The mechanical locking device includes at least one rod-shaped element at the first edge surface and at least one insertion groove at the second panel surface. The rod-shaped element is configured to be inserted into the insertion groove. Said set is also comprising a back panel configured to be inserted in and to cooperate with at least one of the first and second panel grooves and at least one locking gear configured to cooperate with the back panel and the first and/or second panel groove, for locking of the first panel to the second panel.

SUMMARY

Accordingly, embodiments of the present disclosure preferably seek to further provide alternative mounting solutions that require a minimum of tools and that facilitates having a tight fit between two panels by providing a mechanical connection arrangement and a method of connecting to panels with such a mechanical connection arrangement according to the appended patent claims.

According to one aspect of the present disclosure, a mechanical connection arrangement for panels comprises a first panel, a second panel and a mechanical locking device for locking the first panel to the second panel. A surface of the first panel and a surface of the second panel are parallel and in contact in a locked position of the first and second panels. The mechanical locking device comprises at least one rod-shaped element at said surface of the first panel and at least one corresponding insertion recess at said surface of the second panel. The rod-shaped element is configured to be inserted in the insertion recess.

The lateral side of the rod-shaped element extends at a first angle from the surface of the first panel and the lateral side of the insertion recess extends into the second panel at a second angle from the surface of the second panel.

The rod-shaped element may be configured to bend when inserted in the insertion recess, such that the first angle in the locked position is different from the first angle in the unlocked position.

A difference between the first angle in the locked position and the first angle in the unlocked position may be in the range of about 0.5° to about 6°, such as about 1° to about 4°, such as about 1° to about 3°, such as about 1° to about 2 The first angle in the locked position may be greater than the first angle in the unlocked position.

The difference between the first angle and the second angle may be in a range of about 0.5° to about 6° in an unlocked position of the first and second panels wherein the rod-shaped element and the insertion recess are arranged such that the difference between the first angle and the second angle is smaller in the locked position compared to when in the non-locked position.

In the context of this disclosure, a panel is a flat piece of construction material made to form a part of a surface or a complete surface. Generally, panels used for furniture are rectangular such that they have two opposing flat surface sides and four edge surfaces that are parallel in pairs. However, panels having other shapes are not excluded, such as for instance triangular panels. Also, panels having at least one bevelled edge each, usually at 45°, such that two panels can form a mitre joint is also considered in the context of the disclosure.

Also, the rod-shaped element could have an equally large cross-section area throughout the entire length with the insertion recess having a corresponding shape. In a further possible embodiment, the rod-shaped element could have the shape of a truncated cone and the insertion recess could have a shape that allows for a misalignment between the angles of the lateral sides of the rod-shaped element and the insertion recess. Thus, the concept could be achieved with for instance a cylindrical rod-shaped element and an insertion recess having a narrowing cross-section inwardly.

The tolerance for the angles when drilling/producing holes are generally well below 0.5° in modern production facilities. One of the ideas with the present solution is to deliberately provide a misalignment of the angle of the insertion recess in one panel and the angle of a rod-shaped element protruding from another panel when the two panels are to be connected using the rod-shaped element and the insertion recess. For facilitating the understanding, the insertion recess may be a cylindrical hole with an axis having a specific angle relative the surface where the opening of the hole is. The rod-shaped element may be cylinder-shaped, i.e., having a cylindrical cross section and also an axis in another angle relative the surface from which the rod-shaped element is protruding. Normally, the panel with the rod-shaped element is made by inserting a rod-shaped element into a hole drilled or made in some other way in a panel.

The deliberate misalignment of the insertion recess and the rod-shaped element provides for a tighter fit between the two panels since pressing the panels together such that the surface of the first panel and the surface of the second panel come into full contact with each other will result in the rod-shaped element partially compressing the inside of the insertion recess to plastic and/or elastic deformation and/or partially compressing the side of the rod-shaped element to plastic and/or elastic deformation inside the insertion recess and/or bending the rod-shaped element plastically and/or elastically. The deformation/compression of either the insertion recess and/or the rod-shaped element will provide for a stronger connection between the two panels than if the insertion recess and rod-shaped element would have been normally aligned for a typical plug and socket connection. This is a result of that the rod-shaped element and the insertion recess are arranged such that the difference between the first angle and the second angle is smaller in the locked position of the panels compared to when in the non-locked position. According to an aspect of the present disclosure the difference in the unlocked position between the first angle and the second angle may be in a range of about 0.5° to about 6°, in a range of about 2° to about 4°, or about 3°. For applications regarding panels used for furniture, this angle range may be advantageous.

According to another aspect of the present disclosure, the rod-shaped element is made of a material that is harder than at least the core of the second panel. Thus, the inside of the second panel is subjected to a somewhat greater compression/deformation as compared to the rod-shaped element.

According to an alternative aspect of the present disclosure, the second panel has an outer layer adjacent said surface that is harder than the material in the core of the panel. The insertion recess opening is more likely not to be affected by the compression/deformation which is an advantage for the positioning of the two panels relative each other. Rather, the inside of the panel will be compressed/deformed before the opening of the insertion recess will be compressed/deformed.

According to yet another aspect of the present disclosure wherein the rod-shaped element is made from one of or a combination of wood-based materials, polymers, and metals.

Further to materials, according to one aspect of the present disclosure, at least the core of the second panel is wood-based or plastic with or without fillers.

According to a further aspect of the present disclosure, the rod-shaped element is cylinder-shaped and the insertion recess has a circular cross section. The diameter of the rod-shaped element is about 90% to 98% of the diameter of the insertion recess, or more preferably 92% to 97% of the diameter of the insertion recess, and most preferably 94% to 96% of the diameter of the insertion recess.

According to yet a further aspect both the first and second angles are in the range of 30° to 60° and more preferably 40° to 50°. Traditionally when assembling furniture rod-shaped elements and corresponding insertion recesses are made with vertical alignment, i.e., with 90° angles. However, with the misalignment strategy it has shown to be advantageous to deviate from having a vertical alignment. Also, if two panels having each a bevelled edge at 45° and the bevelled edges are to be connected to make a mitre joint, the angles are also preferably deviating from a traditional vertical alignment, i.e., relative the contact surfaces of the panels.

According to yet another aspect of the present disclosure, the thickness of the second panel is larger than the diameter of a cylindrical rod-shaped element and smaller than three times the diameter of the cylindrical rod-shaped element.

According to an aspect of the present disclosure the first angle is smaller than the second angle. This facilitates slightly the assembly of the two panels. However, the locking principle still works with the reversed situation, i.e., the first angle being larger than the second angle.

According to another aspect of the present disclosure, the length of contact between the rod-shaped element and the insertion recess on the side closest to the panel side with the insertion recess is longer than the radius of a cylindrical rod-shaped element and shorter than two times the diameter of the rod-shaped element. If the contact length is too short there will be a minimum of the locking properties. If the contact length is too long, it may result in the tension or load on the rod-shaped element and/or the insertion recess being higher than the strength and instead of a tight fit and a lock, the rod-shaped element and/or the panel with the insertion recess might break. Also, a too long contact length may lead to that the two panels are not being able to be brought into contact with each other.

The insertion recess has according to a further aspect of the present disclosure a countersink. This is particularly advantageous if the panel with the insertion recess has a harder outer layer as compared to the core of the panel. Making the countersink corresponding to the thickness of the harder outer layer may prevent that the rod-shaped element affect the surface of the second panel. Also, the harder surface may not affect the rod-shaped element. Depending on the combination of materials in the panel versus the rod-shaped element, it may be that the rod-shaped element presses the edge of the insertion recess and thus deforming the surface surrounding the insertion recess if no countersink is present.

According to a further aspect of the present disclosure the first panel further comprises a second rod-shaped element extending at the same angle as said first rod-shaped element wherein the second rod-shaped element is shorter than said first rod-shaped element. Thus, the second rod-shaped element will not extend as far into its insertion recess of the second panel as said first rod-shaped element. This allows for easier assembly/connection of the two panels. If, for instance, there are more than two rod-shaped elements for one connection, every other of the rod-shaped elements could be shorter.

In order to further secure the connection of the two panels, according to a further aspect of the present disclosure the connection arrangement further comprises a locking arrangement. The locking arrangement is arranged such that the rod-shaped element and insertion recess do not detach and thus the two panels. For instance, a compressible locking element, such as spring-loaded element, extending at an angle different from the rod-shaped element could be arranged to snap into an insertion recess when the two panels are in a final/desired position relative each other. A further alternative could be a simple screw or nail that is inserted such that movement of the rod-shaped element in an axial direction out of the insertion recess is prevented.

According to an aspect of the present disclosure the first panel comprises a compressible locking element and the second panel comprises a recess, wherein a tip of the compressible locking element is configured to cooperate in the locked position with the recess.

The compressible locking element may comprise a polymer material, such as a thermoplastic material, optionally with an enforcement, such as glass fibre The compressible locking element may be injection moulded in one piece According to a further aspect of the present disclosure a method is provided for connecting two panels to one another with an arrangement as previously disclosed. The method comprises placing the panel with the rod-shaped element such that the tip of the rod-shaped element is arranged at the insertion recess of the second panel and such that the axis of the rod-shaped element is in line with the axis of the insertion recess.

Also, bringing the panels together by inserting the rod-shaped element into the insertion recess, and pressing the panels together such that the surface of the first panel and the surface of the second panel come into full contact with each other and a locked position by the rod-shaped element partially compressing the inside of the insertion recess to plastic and/or elastic deformation and/or partially compressing the side of the rod-shaped element to plastic and/or elastic deformation inside the insertion recess and/or bending the rod-shaped element plastically and/or elastically.

It should be emphasized that the term "comprises/comprising" when used in this specification is taken to specify the presence of stated features, integers, steps, or components but does not preclude the presence or addition of one or more other features, integers, steps, components, or groups thereof.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION OF EXAMPLE EMBODIMENTS

Figure 1:
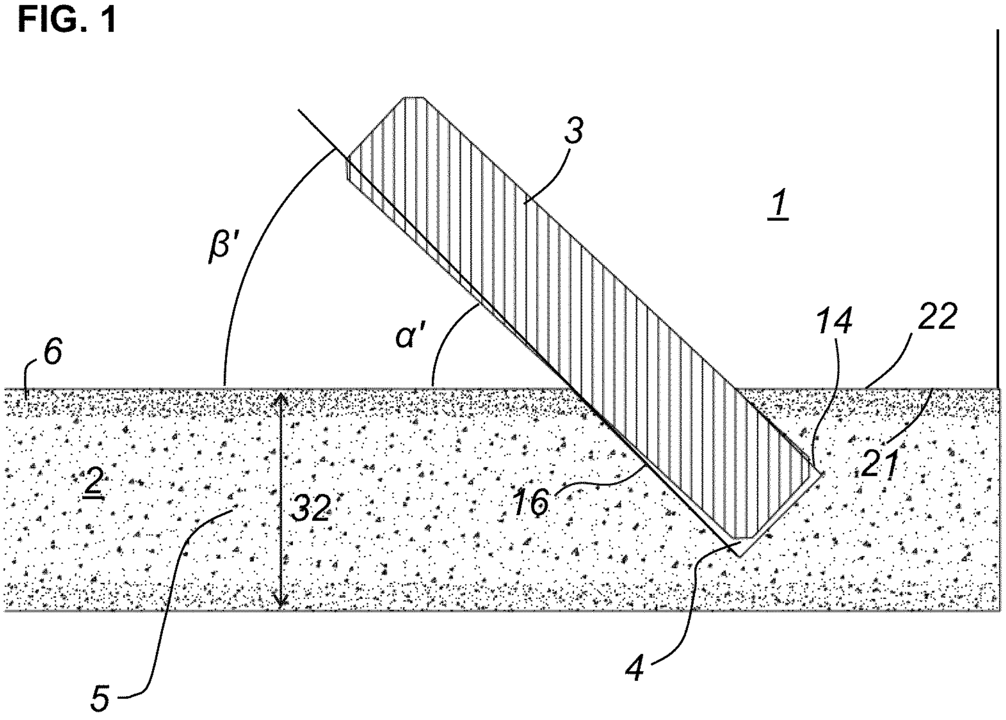
FIG. 1 is a partial cross section of an embodiment according to the present disclosure.

Specific embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings and in the description, like numbers refer to like elements.

FIG. 1 shows a mechanical connection arrangement for panels 1, 2, comprising a first panel 1, a second panel 2, and a mechanical locking device for locking the first panel 1 to the second panel 2. A surface 21 of the first panel 1 and a surface 22 of the second panel 2 are parallel and in contact in a locked position of the first and second panels 1, 2. The mechanical locking device comprises a rod-shaped element 3 at said surface of the first panel 1 and one corresponding insertion recess 4 at said surface of the second panel 2. The rod-shaped element 3 is inserted in the insertion recess 4. The rod-shaped element 3 extends at a first angle $\alpha'$ from the surface 21 of the first panel 1 and the insertion recess 4 extends into the second panel 2 at a second angle $\beta'$ from the surface of the second panel 2.

FIG. 1 shows the first panel 1 and second panel 2 in the locked position. The difference in the locked position between the first angle $\alpha'$ and the second angle $\beta'$ is in a range of about 0 to about 3° and more preferably in a range of about 1° to about 2°. In the shown embodiment the first angle $\alpha'$ is smaller than the second angle $\beta'$.

The first panel 1 and/or of the second panel 2 may be a wood-based panel, such as comprising a MDF, HDF, OSB, WPC, plywood, or particleboard.

The first panel 1 and/or of the second panel 2 may comprise a plastic material, such as thermosetting plastic or thermoplastic e.g., vinyl, PVC, PU or PET. The plastic material may comprise fillers.

The first panel 1 and/or the second panel 2 may also comprise a solid wood board.

The first panel 1 and/or the second panel 2 may comprise a decorative layer, such as a foil or a veneer, on one or more surfaces.

Figure 7:
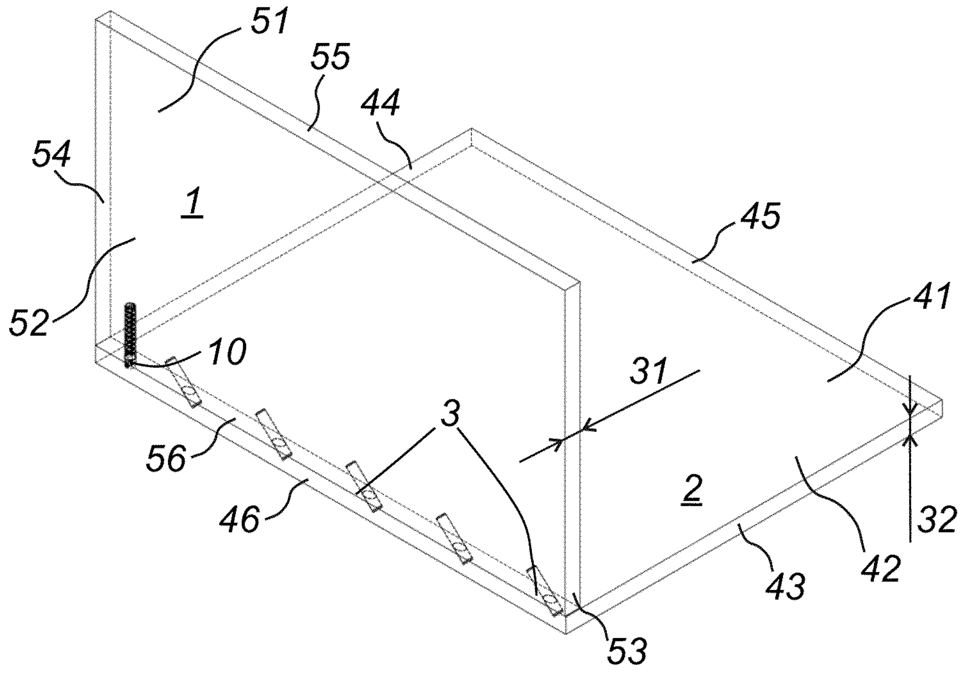
FIG. 7 is a perspective view of two panels attached to each other with a connection arrangement of the present disclosure.

A thickness 31 of the first panel 1, see FIG. 7, and/or a thickness 32 of the second panel 2 may be in a range of about 8 mm to about 30 mm, or in a range of about 12 mm to about 25 mm, or about 20 mm Also illustrated in FIG. 1 is that the second panel 2 has an outer layer 6 adjacent said surface that is harder than the material in the core 5 of the panel. For instance, the second panel 2 could be of a wood-based material that is compressed on the top and bottom faces of the panel 2 such that the outer layer 6 closest to surface(s) has a higher density and thus harder. The thickness of the outer layer 6 may be 0.5 to 4 mm, such as 1 to 3 mm, such as 1.5 to 2.5 mm.

Further, in the shown embodiment the rod-shaped element 3 is made of a material that is harder than the core 5 of the second panel 2. The hardness may be measured by a Brinell test according to ASTM E10-18 or for wood based materials a Janka hardness test according to ASTM D143-21. In this embodiment, the relative hardness may be indicated by that the rod-shaped element 3 being unaffected, i.e., it may still have a uniform diameter. Also, in the insertion recess 4 on the side closest to the surface the rod-shaped element 3 has been forced into the core of the panel such that the insertion recess side is compressed. This is an effect of the misalignment or there being a difference in angles β, β.

The insertion recess 4 comprises an upper side 14 and an opposite lower side 16.

In the shown embodiment the rod-shaped element 3 is cylinder-shaped and the insertion recess 4 has a circular cross section. The diameter of the rod-shaped element 3 is about 90% to 98% of the diameter of the insertion recess 4, or more preferably 92% to 97% of the diameter of the insertion recess 4, and most preferably 94% to 96% of the diameter of the insertion recess 4. An example of preferred diameters would be to have the rod-shaped element 3 with a diameter of 8 mm and the insertion recess 4 with a diameter of 8.4 mm.

If the second panel 2 is made of wood-based material it is preferred if also the rod-shaped element 3 is made of a wood-based material. However, any combination could work, for instance, if the panel is wood-based or plastic with or without fillers, the rod-shaped element could be made from one of or a combination of wood-based materials, polymers, and metals. Exemplary fillers may include one or more of chalk, glass fibre or carbon fibre.

In an embodiment, both the first and second angles α, β are in the range of 30° to 60° and more preferably 40° to 50° or about 45° as in the shown embodiment.

In an embodiment, the thickness of the second panel 2 is larger than the diameter of the rod-shaped element 3 and smaller than three times the diameter of the rod-shaped element 3. Also, in an embodiment, the length of contact between the rod-shaped element 3 and the insertion recess 4 on the upper side 14 is longer than the radius of the rod-shaped element 3 and shorter than two times the diameter of the rod-shaped element 3.

Thus, when assembled, the panel 1 with the rod-shaped element 3 is placed such that the tip of the rod-shaped element 3 is arranged at the opening of the insertion recess 4 of the second panel and such that the axis of the rod-shaped element 3 is aligned with the axis of the insertion recess 4. Next, the panels 1, 2 are brought together by inserting the rod-shaped element 3 into the insertion recess 4. Finally, the panels 1, 2 are pressed together such that the surface of the first panel 1 and the surface of the second panel 2 come into full contact with each other and a locked position by the rod-shaped element 3 partially compressing the inside of the insertion recess 4. The compression results in plastic and/or elastic deformation and/or partially the side of the rod-shaped element 3 to plastic and/or elastic deformation inside the insertion recess and/or bending the rod-shaped element 3 plastically and/or elastically. In the shown example, only the inside of the insertion recess 4 is plastically and/or elastically deformed by the compression. Also, in the shown embodiment, since the outer layer 6 of the panel 2 is harder than the core 5 of the panel 2, the opening of the insertion recess 4 functions as pivot point for the rod-shaped element, i.e., only, or at least primarily only, the core 5 is affected by the misalignment between the axis of the rod-shaped element 3 and the axis of the insertion recess 4 when the panels 1, 2 are pressed together into full contact with one another.

In FIG. 1, the panel 1 with the rod-shaped element 3 could be considered as a cuboid in the sense that the contact surface of panel 1 is an edge surface and the contact surface of panel 2 is a face surface.

Figure 2:
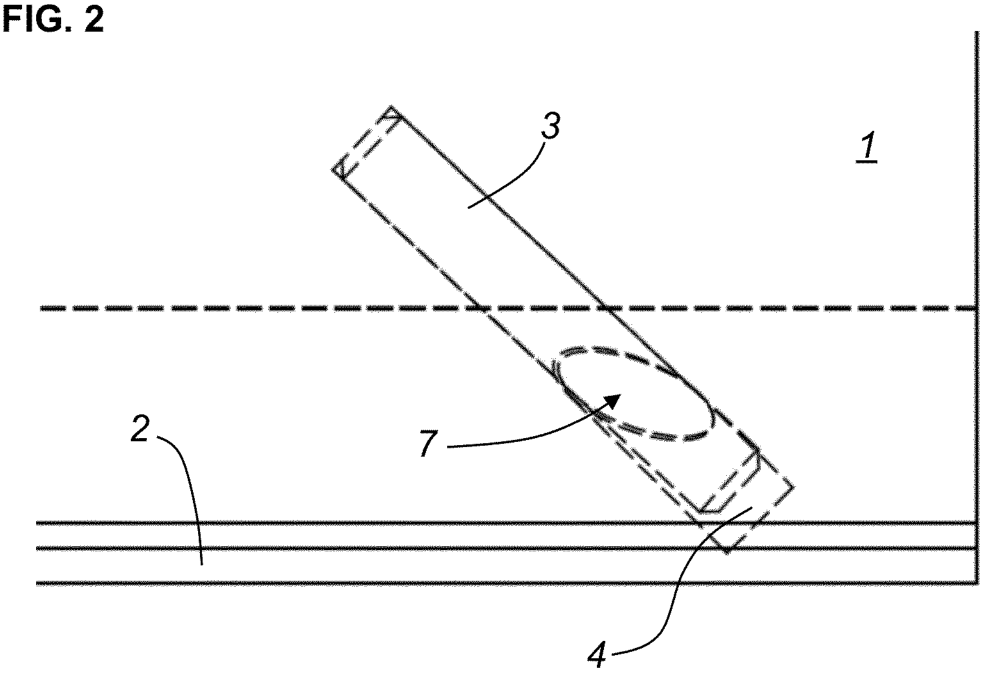
FIG. 2 is a partial side view of a further embodiment according to the present disclosure.
Figure 3:
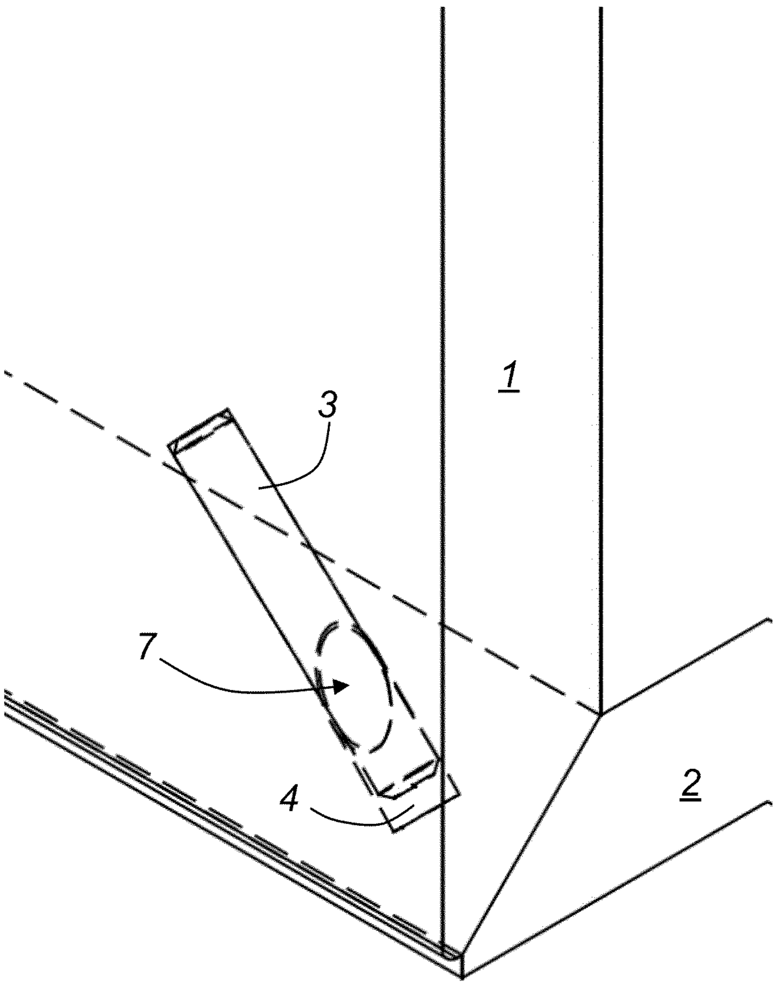
FIG. 3 is a partial perspective of the embodiment shown in FIG. 2.
Figure 4:
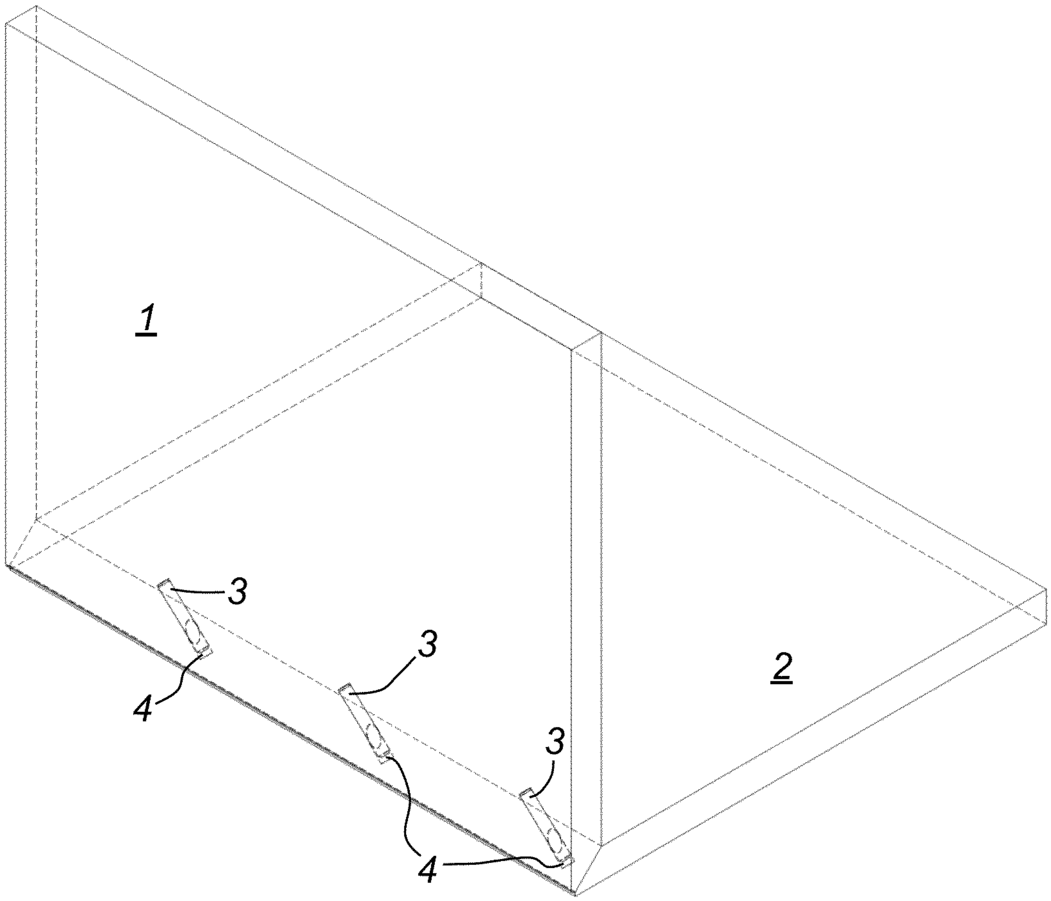
FIG. 4 is a perspective view of an embodiment according to the present disclosure.

Turning to FIGS. 2-4, an alternative to the contact surfaces shown in FIG. 1 is shown. One edge on each panel 1, 2 has a bevelling and these bevelled edges are in contact with one another to form a mitre joint. The figures show a mechanical connection arrangement for panels 1, 2, comprising a first panel 1, a second panel 2, and a mechanical locking device for locking the first panel 1 to the second panel 2. A surface of the first panel 1 and a surface of the second panel 2 are parallel and in contact in the locked position of the first and second panels 1, 2. The mechanical locking device comprises a rod-shaped element 3 at said surface of the first panel 1 and one corresponding insertion recess 4 at said surface of the second panel 2. The rod-shaped element 3 is inserted in the insertion recess 4. The rod-shaped element 3 extends at a first angle from the surface of the first panel 1 and the insertion recess 4 extends into the second panel 2 at a second angle from the surface of the second panel 2.

In the locked position a difference between the first angle α' and the second angle s' may be in a range of about 0 to about 3° and more preferably in a range of about 1° to about 2°. In the shown embodiment the first angle α' is smaller than the second angle β'.

In the shown embodiment of FIGS. 2-4, the rod-shaped element 3 is cylinder-shaped and the insertion recess 4 has a circular cross section. The diameter of the rod-shaped element 3 is about 90% to 98% of the diameter of the insertion recess 4, or more preferably 92% to 97% of the diameter of the recess 4, and most preferably 94% to 96% of the diameter of the insertion recess 4. An example of preferred diameters would be to have the rod-shaped element 3 with a diameter of 8 mm and the insertion recess 4 with a diameter of 8.4 mm.

If the second panel 2 is made of wood-based material, it is preferred if also the rod-shaped element 3 is made of a wood-based material. However, any combination could work, for instance, if the panel is wood-based or plastic with or without fillers, the rod-shaped element could be made from one of or a combination of wood-based materials, polymers, and metals.

In an embodiment, both the first and second angles are in the range of 30° to 60° and more preferably in the range of 40° to 50°.

In an embodiment, the thickness of the second panel 2 is larger than the diameter of the rod-shaped element 3 and smaller than three times the diameter of the rod-shaped element 3. Also, in an embodiment, the length of contact between the rod-shaped element 3 and the insertion recess 4 on the upper side 14 is longer than the radius of the rod-shaped element 3 and shorter than two times the diameter of the rod-shaped element 3.

Thus, when assembled, the panel 1 with the rod-shaped element 3 is placed such that the tip of the rod-shaped element 3 is arranged at the opening 7 of the insertion recess 4 of the second panel and such that the axis of the rod-shaped element 3 is aligned with the axis of the insertion recess 4. Next, the panels 1, 2 are brought together by inserting the rod-shaped element 3 into the insertion recess 4. Finally, the panels 1, 2 are pressed together such that the surface of the first panel 1 and the surface of the second panel 2 come into full contact with each other and a locked position by the rod-shaped element 3 partially compressing the inside of the insertion recess 4. The compression results in plastic and/or elastic deformation and/or partially the side of the rod-shaped element 3 to plastic and/or elastic deformation inside the insertion recess and/or bending the rod-shaped element 3 plastically and/or elastically. In the shown example, only the inside of the insertion recess 4 is plastically and/or elastically deformed by the compression.

For having a more stable connection between the two panels 1, 2, at least two mechanical locking devices should be arranged along the contact surface and preferably evenly distributed. In FIG. 4, three locking devices are shown.

The rod-shaped element 3 is generally pushed/pressed into a much tighter insertion recess in the first panel 1 in a pre-assembly step. Generally, it is preferred that the rod-shaped element 3 extends longer into said panel compared to the length of the rod-shaped element 3 that extends into the insertion recess 4 of the second panel 2. In other words, the part of the rod-shaped element 3 that is embedded in the insertion recess 4 in an assembled state of the two panels 1, 2 is smaller than the part embedded in the first panel 1, lengthwise.

Figure 5:
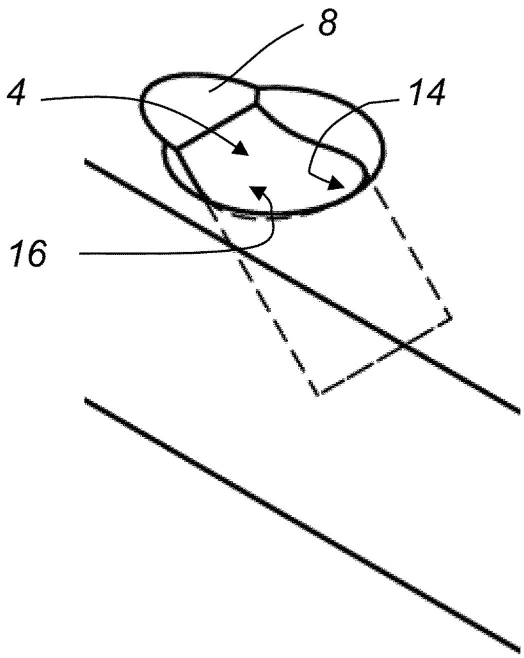
FIG. 5 is a perspective view of an alternative insertion recess according to the present disclosure.
Figure 6:
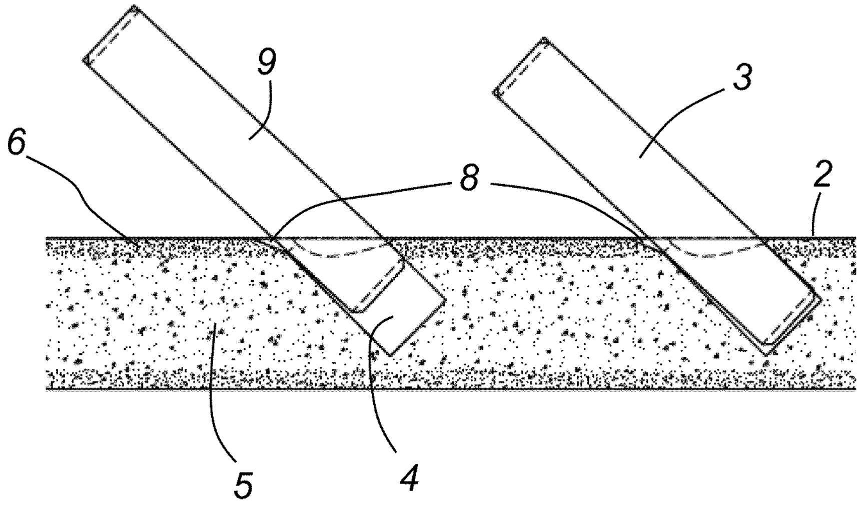
FIG. 6 is a side view of an alternative embodiment of connection arrangement according to the present disclosure.

In FIG. 5, an insertion recess 4 is shown with a countersink 8. The insertion recess 4 comprises an upper side 14 and an opposite lower side 16. The insertion recess 4 comprises the countersink 8 at the lower side 16, such as along 45 to 270°, such 90 to 180°, of the circumference of the insertion recess 4. This is particularly advantageous if the panel 2 with the insertion recess 4 has a harder outer layer 6 as compared to the core 5 of the panel 2 as is indicated in FIG. 6. Making the countersink 8 corresponding to the thickness of the harder outer layer 6 may prevent that the rod-shaped element 3, 9 affects the surface of the second panel 2. Also, the harder outer layer may not affect the rod-shaped element 3, 9. Depending on the combination of materials in the panel 2 versus the rod-shaped element 3, 9, it may be that the rod-shaped element 3, 9 presses the edge of the insertion recess and thus deforming the surface surrounding the insertion recess 4 if no countersink 8 is present.

Also, in FIG. 6, the first panel further comprises another rod-shaped element 9 extending at the same angle as the first rod-shaped element 3. In an embodiment, second rod-shaped element 9 will not extend as far into its insertion recess 4 of the second panel 2 as the first rod-shaped element 3.

As shown in FIG. 6, the second rod-shaped element 9 is shorter than the first rod-shaped element 3 and is arranged such that the second rod-shaped element 9 will not extend as far into its insertion recess 4 of the second panel 2 as the first rod-shaped element 3. In another embodiment, the second rod-shaped element 9 is embedded deeper in the first panel 1, such that the second rod-shaped element 9 will not extend as far into its insertion recess 4 of the second panel 2 as the first rod-shaped element 3. Having the second rod-shaped element 9 not extend as far into its insertion recess 4 of the second panel 2 as the first rod-shaped element 3 allows for easier assembly/connection of the two panels.

When assembling/connecting the two panels, the first rod-shaped element 3 is first inserted into its insertion recess and only when the connection is coming close to being completed the second rod-shaped element 9 enters its insertion recess 4 and a final pressing of the first panel towards the second panel 2 can be made using a smaller force as compared to if the two rod-shaped elements would have been equally long. Preferably, the longer of the rod-shaped elements is arranged to be positioned the closest to a corner of the two panels being connected. For instance, in FIG. 7, if one of the rod-shaped elements only is the longer one it should be the one farthest to the right in the figure. The longer rod-shaped elements form a stronger connection between two panels since the contact surface between the rod-shaped element and the insertion recess is larger, and due to the misalignment, also provide for higher friction as a result of the larger compression.

Figure 8:
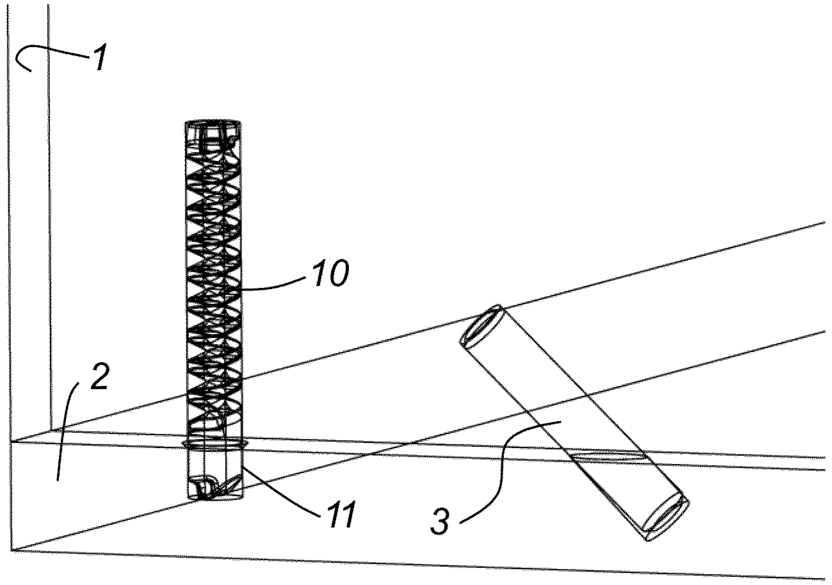
FIG. 8 is a partial enlargement of the arrangement shown in FIG. 7.

In order to further secure the connection of the two panels 1, 2, the connection arrangement may further comprise a locking arrangement 10, 11. The locking arrangement is arranged such that the rod-shaped element 3, 9 and the insertion recess 4 do not detach and thus the two panels 1, 2. In FIGS. 7 and 8 is shown how a compressible locking element 10, such as a spring-loaded element, extends at an angle different from the rod-shaped elements 3, 9 and is arranged to snap into a recess 11 when the two panels 1, 2 are in a final/desired position relative each other.

The compressible locking element 10 may comprise a polymer material, such as a thermoplastic material, optionally with an enforcement, such as glass fibre.

The compressible locking element 10 may be injection moulded in one piece.

Figure 9:
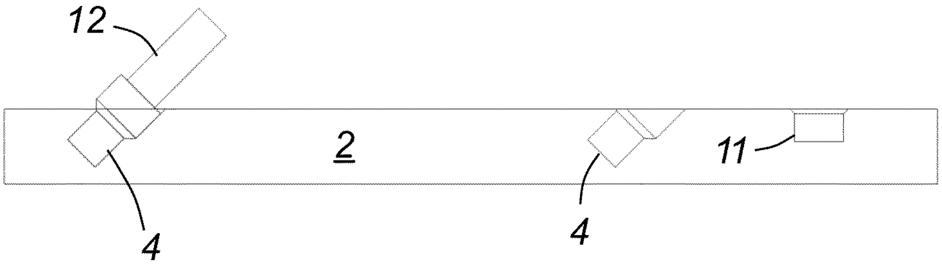
FIG. 9 is a side view of a countersink being made in a panel.
Figure 10:
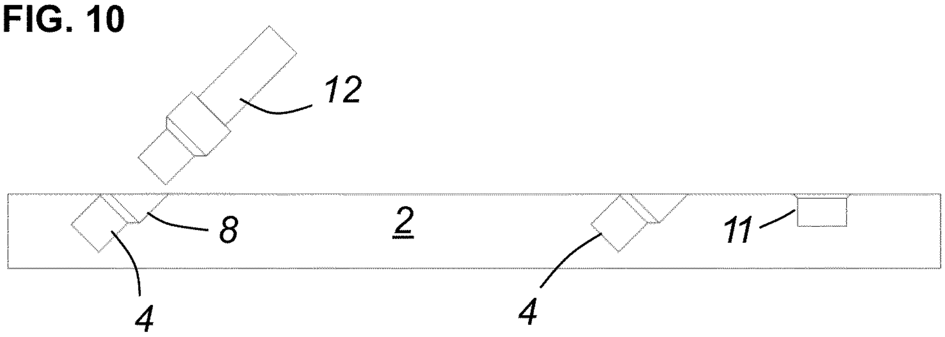
FIG. 10 is a side view of the panel in FIG. 9 after the drill is removed.

Turning to FIGS. 9 and 10, a drill 12 producing the countersink 8 in the second panel 2 can be seen. The countersink 8 enables the deliberate misalignment between the rod-shaped element 8 and the insertion recess 4 when the surface of the panel 2 is made of a harder material than the core of the panel or even harder than the rod-shaped element 3.

Figure 11:
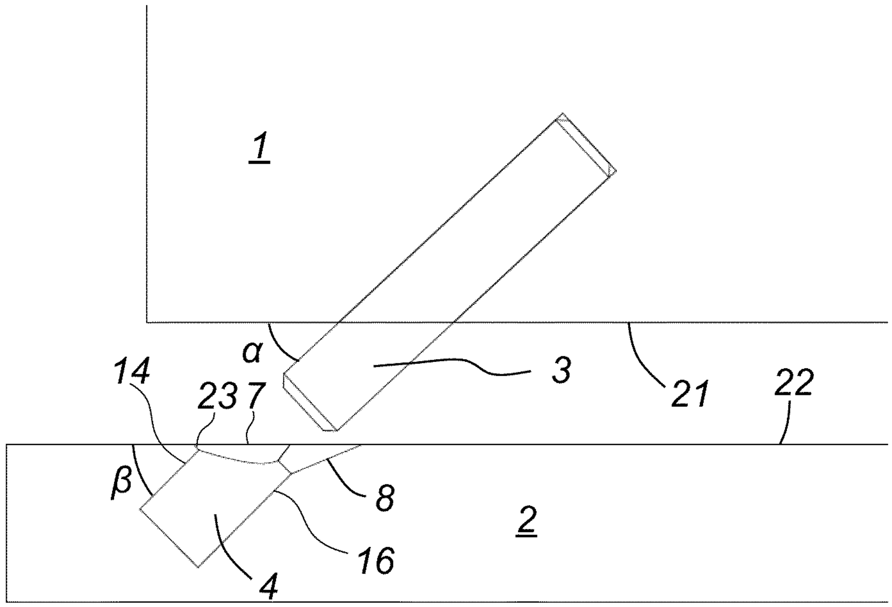
FIG. 11 is a partial side view showing an insertion recess and a rod-shaped element prior to connection of two panels.

As can be seen in FIG. 11 it may be easier to mount the two panels 1, 2 together when the second panel 2 has larger openings for the rod-shaped elements 3 to "find". The countersink may have the effect that the force required for entering the rod-shaped element 3 into the insertion recess 4 is decreased.

FIG. 11 shows the first panel 1 and second panel 2 in an unlocked position. A lateral surface of the rod-shaped element 3 extends at a first angle α from the surface 21 of the first panel 1, a lateral surface of the insertion recess 4 extends into the second panel 2 at a second angle β from the surface 22 of the second panel 2.

In the unlocked position a difference between the first angle α and the second angle β may be in a range of about 0.5° to about 6°, such as about 2° to about 4°, or about 3°.

The insertion recess 4 comprises an upper side 14 and an opposite lower side 16. The second panel 2 may comprise a countersink 8 at an opening 7 of the insertion recess 4 and at the lower side 16 of the insertion recess 4.

The second panel 2 may comprise a bevel 23 at an edge of an opening of the insertion recess 4 and at the upper side 16 of the recess 16. The bevel 23 is configured to make the edge of the opening blunt. A blunt edge may prevent that the edge cuts into the rod-shaped element 3 when the rod-shaped element 3 is displaced into the insertion recess 4.

Figure 12:
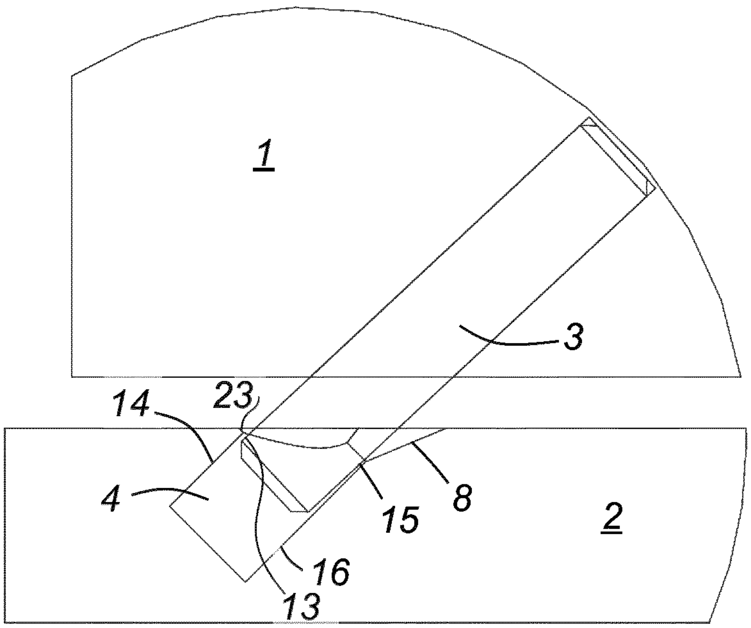
FIG. 12 is partial side view showing the rod-shaped element in the insertion recess at a first contact stage.

Moving on to FIG. 12, the rod-shaped element 3 is displaced into the insertion recess 4.

Initially an upper edge 13 of the rod-shaped element 3 may be in contact with the upper side 14 of the insertion recess 4. A lower edge 15 of the rod-shaped element 3 may be at a distance from the lower side 16 of the insertion recess 4.

Figure 13:
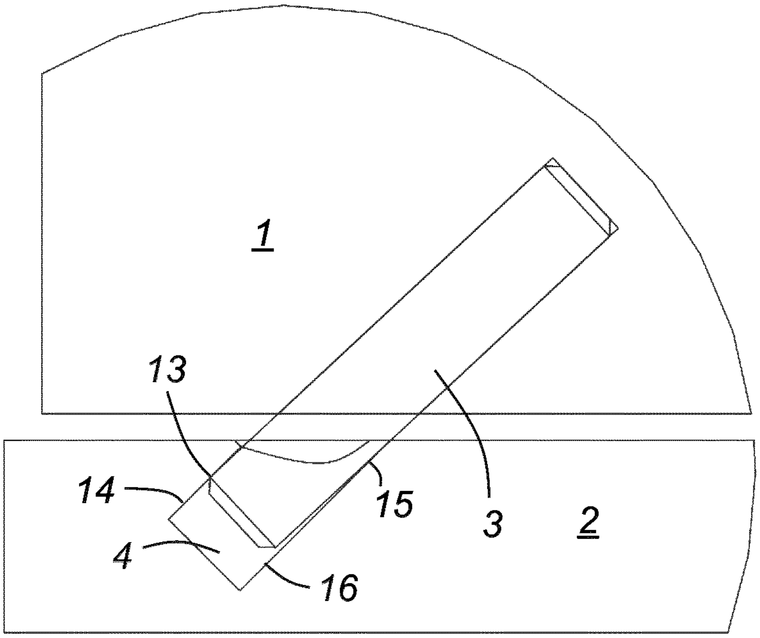
FIG. 13 is partial side view showing the rod-shaped element in another embodiment of the insertion recess at a first contact stage.

FIG. 13 shows an embodiment of the insertion recess 4 which does not comprise the counter sink. In this embodiment the rod-shaped element 3 is squeezed against the lower side 16 of the insertion recess 4 at the opening of the insertion recess 4.

Figure 14:
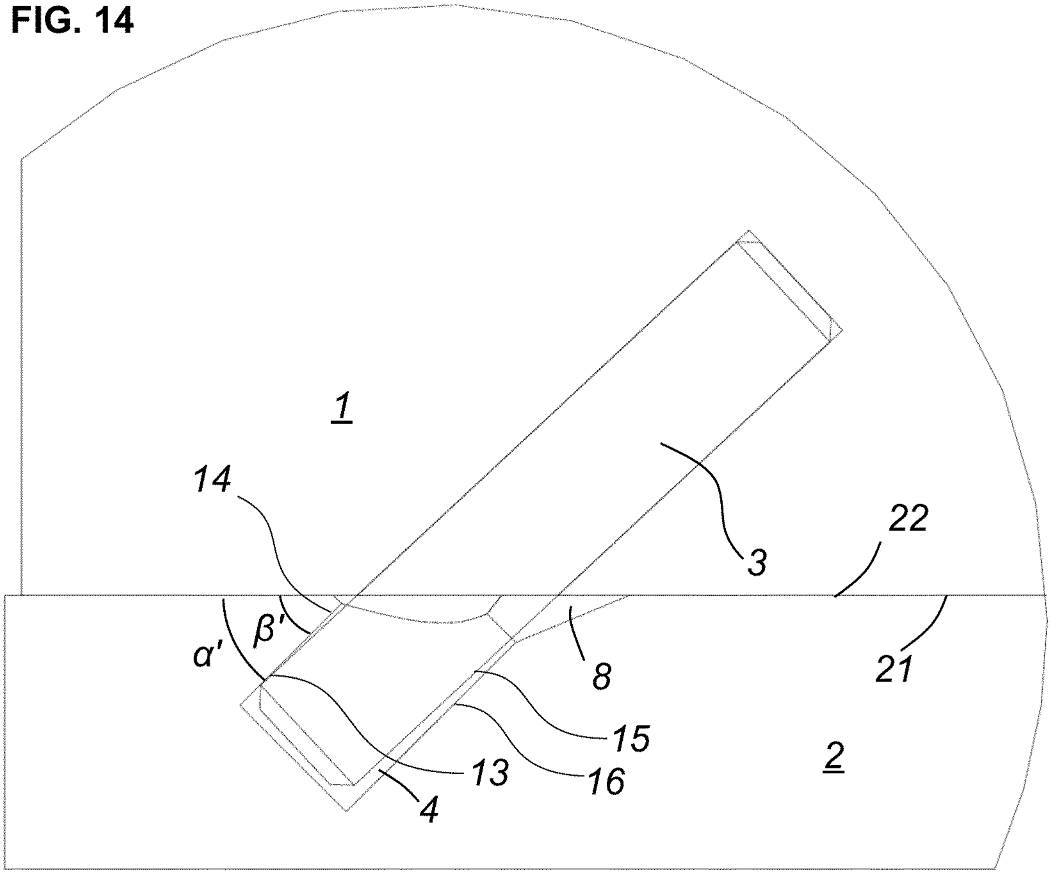
FIG. 14 is a partial side view showing the rod-shaped element fully inserted in the insertion recess.

In FIG. 14 the panels 1, 2 are in a locked position and the contact between the rod-shaped element 3 and the insertion recess 4 is increased due to that the compression results in plastic and/or elastic deformation and/or partially the side of the rod-shaped element 3 to plastic and/or elastic deformation inside the insertion recess and/or bending the rod-shaped element 3 plastically and/or elastically such that the difference in angle of the rod-shaped element 3 and the insertion recess 4 may decrease in the locked position.

The first angle α, α' and the second angle β, β' may be measured, in the unlocked position and in the locked position, respectively, by a CT scanner.

The first angle α, α' may be measured in a central plane of the rod-shaped element 3, such as a central plane which is parallel to a main plane of the first panel 1.

The first panel 1 may comprise two opposing flat surface sides 41, 42 and four edge surfaces 43, 44, 45, 46 that are parallel in pairs, see FIG. 7. The main plane of the first panel 1 may be parallel with the two opposing flat surfaces 41, 42.

The second panel 2 may comprise two opposing flat surface sides 51, 52 and four edge surfaces 53, 54, 55, 56 that are parallel in pairs, see FIG. 7. A main plane of the second panel 2 may be parallel with the two opposing flat surface sides 51, 52.

The second angle β, β' may be measured in a central plane of the insertion recess 4, such as a central plane which is perpendicular to the main plane of the second panel 2.

The rod-shaped element may be configured to bend when inserted in the insertion recess, such that the first angle in the locked position α' is different from the first angle in the unlocked position α.

A difference between the first angle α' in the locked and the first angle α in the unlocked position may be in the range of about 0.5° to about 6°, such as about 1° to about 3°, such as about 1° to about 2.

The first angle α' in the locked position may be greater than the first angle α in the unlocked position.

In the locked position, lower edge 15 of the rod-shaped element 3 may be at a distance from the lower side 16 of the insertion recess 4.

In the locked position, upper edge 13 of the rod-shaped element 3 may be in contact with the upper side 14 of the insertion recess 4.

In the locked position, a difference between the first angle α' and the second angle s' may be in a range of about 0 to about 3°, such as about 1° to about 2°.

The first angle α' may be smaller than the second angle β'.

FIG. 11-14 show that the two panels 1, 2 may be connected to one another by:

- placing the panel 1 with the rod-shaped element 3 such that the tip of the rod-shaped element 3 is arranged at the opening 7 of the insertion recess 4 of the second panel and such that the axis of the rod-shaped element 3 is aligned with the axis of the insertion recess 4,
- bringing the panels 1, 2 together by inserting the rod-shaped element 3 into the insertion recess 4,
- pressing the panels 1, 2 together such that the surface of the first panel 1 and the surface of the second panel 2 come into full contact with each other and a locked position by the rod-shaped element 3 partially compressing the inside of the insertion recess 4 to plastic and/or elastic deformation and/or partially compressing the side of the rod-shaped element 3 to plastic and/or elastic deformation inside the insertion recess and/or bending the rod-shaped element 3 plastically and/or elastically.

Figure 15:
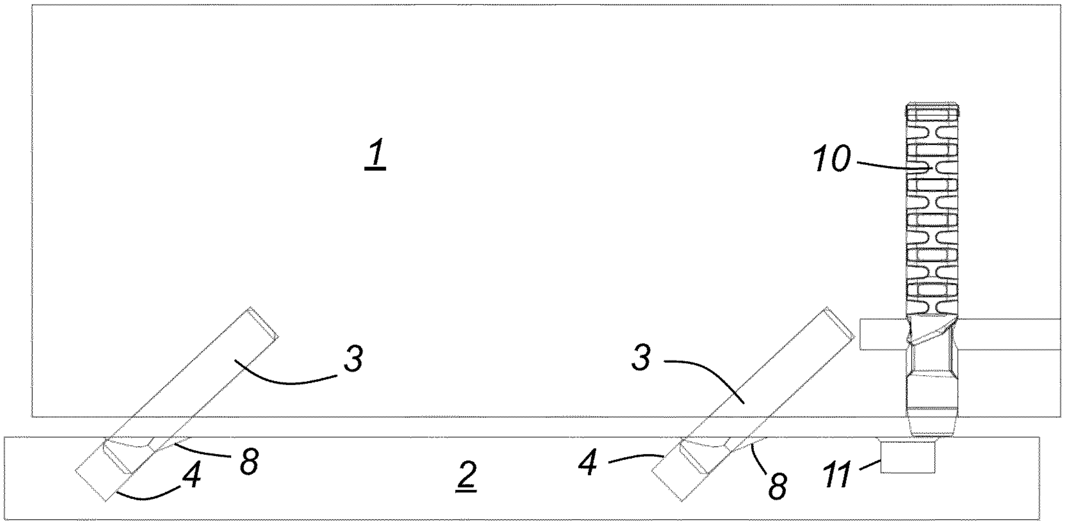
FIG. 15 is a side view of two panels at a first contact stage.

FIG. 15 shows the connection of two panels 1, 2 and more specifically the function of an embodiment of the locking arrangement 10, 11 with the tip of the compressible locking element 10 in an initial contact with the surface of the second panel 2.

Figure 16:
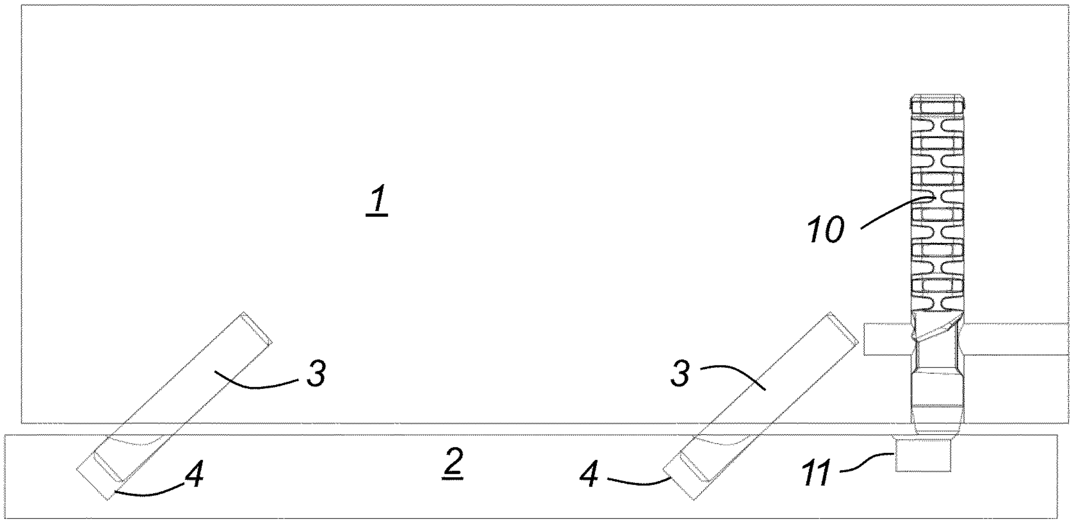
FIG. 16 is a side view of another embodiment of the two panels at a first contact stage.

FIG. 16 shows connection of an embodiment of the panels 1, 2 with an embodiment of the insertion recess 4 that does not comprise a counter sink. In this embodiment the rod-shaped element 3 is squeezed against the lower side 16 of the insertion recess.

Figure 17:
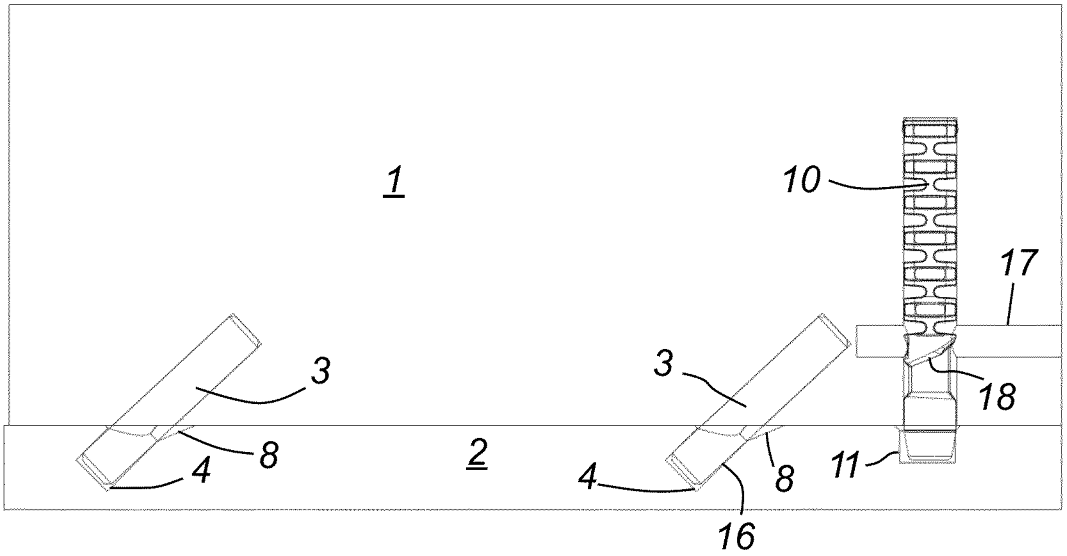
FIG. 17 is side view of two panels in a locked stage.

The two panels 1, 2 are shown in the locked position in FIG. 17 where the tip of the compressible locking element 10, such as a spring-loaded element, has been pushed to its final position in a recess 11. To unlock the two panels 1, 2, a tool (not shown) can be inserted in a groove 17 of the first panel 1 to push against an inclined surface 18 on the compressible locking element 10.

Further embodiments of the invention are described below:

1. A mechanical connection arrangement for panels (1, 2), comprising a first panel (1), a second panel (2) and a mechanical locking device for locking the first panel (1) to the second panel (2), wherein a surface (21) of the first panel (1) and a surface (22) of the second panel (2) are parallel and in contact in a locked position of the first and second panels (1, 2), the mechanical locking device comprising at least one rod-shaped element (3) at said surface of the first panel (1) and at least one corresponding insertion recess (4) at said surface of the second panel (2), wherein the rod-shaped element (3) is configured to be inserted in the insertion recess (4), a lateral surface of the rod-shaped element (3) extends at a first angle (α) from the surface (21) of the first panel (1), a lateral surface of the insertion recess (4) extends into the second panel (2) at a second angle (β) from the surface (22) of the second panel (2), characterized in that a difference between the first angle (α) and the second angle (β) is in a range of about 0.5° to about 6° in an unlocked position of the first and second panels (1, 2), wherein the rod-shaped element (3) and the insertion recess (4) are configured such that a difference between the first angle (α) and the second angle (β) is smaller in the locked position compared to when in the unlocked position.

2. The mechanical connection arrangement according to embodiment 1, wherein in the unlocked position the difference between the first angle (α) and the second angle (β) is of the first and second panels (1, 2) is in a range of about 2° to about 4°, or about 3°.

3. The mechanical connection arrangement according to any of the preceding embodiments, wherein the rod-shaped element (3) is made of a material that is harder than at least the core (5) of the second panel (2).

4. The mechanical connection arrangement according to any of the preceding embodiments, wherein the second panel (2) has an outer layer (6) adjacent said surface that is harder than the material in the core (5) of the panel.

5. The arrangement according to any of the preceding embodiments, wherein the rod-shaped element (3) is made from one of or a combination of wood-based materials, polymers, and metals.

6. The mechanical connection arrangement according to any of the preceding embodiments, wherein at least the core (5) of the second panel (2) is wood-based or plastic with or without fillers.

7. The mechanical connection arrangement according to any of the preceding embodiments, wherein the rod-shaped element (3) is cylinder-shaped and the insertion recess (4) has a circular cross section, the diameter of the rod-shaped element (3) being about 90% to 98% of the diameter of the insertion recess (4), or more preferably 92% to 97% of the diameter of the insertion recess (4), and most preferably 94% to 96% of the diameter of the insertion recess (4).

8. The mechanical connection arrangement according to any of the preceding embodiments, wherein both the first and second angles (α, β) are in a range of about 30° to about 60°, or in a range of about 40 to about 50°.

9. The mechanical connection arrangement according to any of the preceding embodiments, wherein the thickness of the second panel (2) is larger than the diameter of a cylindrical rod-shaped element (3) and smaller than three times the diameter of the cylindrical rod-shaped element (3).

10. The mechanical connection arrangement according to any of the preceding embodiments, wherein the first angle (α) is smaller than the second angle (β).

11. The mechanical connection arrangement according to any of the preceding embodiments, wherein the insertion recess (4) comprises an upper side (14) and an opposite lower side (16), wherein the length of contact between the rod-shaped element (3) and the insertion recess (4) on the upper side (14) is longer than the radius of a cylindrical rod-shaped element (3) and shorter than two times the diameter of the rod-shaped element (3).

12. The mechanical connection arrangement according to any of the preceding embodiments, wherein the insertion recess (4) has a countersink (8).

13. The mechanical connection arrangement according to embodiment 12, wherein the insertion recess (4) comprises an upper side (14) and an opposite lower side (16), and wherein the lower side (16) comprises the countersink (8).

14. The mechanical connection arrangement according to any of the preceding embodiments, wherein the first panel (1) further comprises a second rod-shaped element (9) extending at the same angle as said first rod-shaped element (3), the second rod-shaped element (9) which is shorter than said first rod-shaped element (3).

15. The mechanical connection arrangement according to any of the preceding embodiments, wherein the first panel (1) further comprises a second rod-shaped element (9), wherein in the locked position the first rod-shaped element (3) extends deeper into the insertion recess (4) than the second rod-shaped element (9') extends into the second insertion recess (4').

16. The mechanical connection arrangement according to any of the preceding embodiments, wherein in the locked position a difference between the first angle (α') and the second angle (β') is in a range of about 0° to about 3°, in a range of about 2° to about 4°, or about 3°.

17. The mechanical connection arrangement according to any of the preceding embodiments, further comprising a locking arrangement (10, 11).

18. A method for connecting two panels (1, 2) to one another with an arrangement according to any of the preceding embodiments comprising:

placing the panel (1) with the rod-shaped element (3) such that the tip of the rod-shaped element (3) is arranged at an opening (7) of the insertion recess (4) of the second panel and such that the axis of the rod-shaped element (3) is aligned with the axis of the insertion recess (4), bringing the panels (1, 2) together by inserting the rod-shaped element (3) into the insertion recess (4), pressing the panels (1, 2) together such that the surface of the first panel (1) and the surface of the second panel (2) come into full contact with each other and a locked position by the rod-shaped element (3) partially compressing the inside of the insertion recess (4) to plastic and/or elastic deformation and/or partially compressing the side of the rod-shaped element (3) to plastic and/or elastic deformation inside the insertion recess and/or bending the rod-shaped element (3) plastically and/or elastically.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used.

When the word "about" is used in this specification in connection with a numerical value, it is intended that the associated numerical value include a tolerance of +/−10% around the stated numerical value.

The indefinite articles "a" and "an," as used herein in the specification and in the claims, unless clearly indicated to the contrary, should be understood to mean "at least one."

The invention claimed is:

1. A mechanical connection arrangement for panels, comprising:

a first panel, a second panel and a mechanical locking device for locking the first panel to the second panel, wherein a surface of the first panel and a surface of the second panel are parallel and in contact in a locked position of the first and second panels, the mechanical locking device comprising at least one rod-shaped element at said surface of the first panel and at least one corresponding insertion recess at said surface of the second panel, wherein the rod-shaped element is configured to be inserted in the insertion recess, a lateral surface of the rod-shaped element extends at a first angle from the surface of the first panel, a lateral surface of the insertion recess extends into the second panel at a second angle from the surface of the second panel, wherein the rod-shaped element is configured to bend when inserted in the insertion recess, such that the first angle in the locked position is different from the first angle in an unlocked position of the first and second panels, wherein the first angle in the locked position and the first angle in the unlocked position, as measured in a same angular direction of measurement, are both greater than 0° and less than 90°.

2. The mechanical connection arrangement according to claim 1, wherein a difference between the first angle in the locked and the first angle in the unlocked position is in the range of about 0.5° to about 6°.

3. The mechanical connection arrangement according to claim 1, wherein the first angle in the locked position is greater than the first angle in the unlocked position.

4. The mechanical connection arrangement according to claim 1, wherein a difference between the first angle and the second angle is in a range of about 0.5° to about 6° in the unlocked position.

5. The mechanical connection arrangement according to claim 1, wherein the rod-shaped element and the insertion recess are configured such that a difference between the first angle and the second angle is smaller in the locked position compared to when in the unlocked position.

6. The mechanical connection arrangement according to claim 1, wherein the first panel comprises a compressible locking element and the second panel comprises a recess, wherein a tip of the compressible locking element is configured to cooperate in the locked position with the recess.

7. The mechanical connection arrangement according to claim 6, wherein the compressible locking element comprises a polymer material.

8. The mechanical connection arrangement according to claim 1, wherein the rod-shaped element is made of a material that is harder than at least the core of the second panel.

9. The mechanical connection arrangement according to claim 1, wherein the second panel has an outer layer adjacent said surface that is harder than the material in the core of the panel.

10. The arrangement according to claim 1, wherein the rod-shaped element is made from one of or a combination of wood-based materials, polymers, and metals.

11. The mechanical connection arrangement according to claim 1, wherein at least the core of the second panel is wood-based or plastic with or without fillers.

12. The mechanical connection arrangement according to claim 1, wherein the rod-shaped element is cylinder-shaped and the insertion recess has a circular cross section, the diameter of the rod-shaped element being about 90% to 98% of the diameter of the insertion recess.

13. The mechanical connection arrangement according to claim 1, wherein both the first and second angles are in a range of about 30° to about 60°.

14. The mechanical connection arrangement according to claim 1, wherein the rod-shaped element is a cylindrical rod-shaped element, and a thickness of the second panel is larger than the diameter of the cylindrical rod-shaped element and smaller than three times the diameter of the cylindrical rod-shaped element.

15. The mechanical connection arrangement according to claim 1, wherein the first angle is smaller than the second angle.

16. The mechanical connection arrangement according to claim 1, wherein the insertion recess comprises an upper side and an opposite lower side, wherein the length of contact between the rod-shaped element and the insertion recess on the upper side is longer than the radius of a cylindrical rod-shaped element and shorter than two times the diameter of the rod-shaped element.

17. The mechanical connection arrangement according to claim 1, wherein the insertion recess has a countersink.

18. The mechanical connection arrangement according to claim 17, wherein the insertion recess comprises an upper side and an opposite lower side, and wherein the lower side comprises the countersink.

19. The mechanical connection arrangement according to claim 1, wherein the rod-shaped element is a first rod-shaped element, and wherein the first panel further comprises a second rod-shaped element extending at the same angle as said first rod-shaped element, the second rod-shaped element which is shorter than said first rod-shaped element.

20. The mechanical connection arrangement according to claim 1, wherein the rod-shaped element is a first rod-shaped element, wherein the first panel further comprises a second rod-shaped element, and wherein in the locked position the first rod-shaped element extends deeper into the insertion recess than the second rod-shaped element extends into the second insertion recess.

21. The mechanical connection arrangement according to claim 1, wherein in the locked position a difference between the first angle and the second angle is in a range of about 0° to about 3°.

22. The mechanical connection arrangement according to claim 1, wherein, in the locked position, the first angle and the second angle are different from one another.

* * * * *